United States Patent
Miller et al.

(10) Patent No.: US 10,214,700 B1
(45) Date of Patent: Feb. 26, 2019

(54) METHODS UTILIZING DURABLE FUNCTIONAL MATERIALS FOR CHEMICAL PROCESSES THAT INCLUDE AN OXIDATION STEP

(71) Applicants: Sandia Corporation, Albuquerque, NM (US); Arizona Board of Regents on behalf of Arizona State University, Scottsdale, AZ (US)

(72) Inventors: James E. Miller, Albuquerque, NM (US); Eric N. Coker, Albuquerque, NM (US); Andrea Ambrosini, Albuquerque, NM (US); Ellen B. Stechel, Tempe, AZ (US)

(73) Assignees: National Technology & Engineering Solutions of Sandia, LLC, Albuquerque, NM (US); Arizona Board of Regents on behalf of Arizona State University, Scottsdale, AZ (US)

( * ) Notice: Subject to any disclaimer, the term of this patent is extended or adjusted under 35 U.S.C. 154(b) by 15 days.

(21) Appl. No.: 15/280,758

(22) Filed: Sep. 29, 2016

Related U.S. Application Data

(60) Provisional application No. 62/234,470, filed on Sep. 29, 2015.

(51) Int. Cl.
*C10J 3/72* (2006.01)
*C01B 3/32* (2006.01)
*C01B 3/36* (2006.01)

(52) U.S. Cl.
CPC ............. *C10J 3/725* (2013.01); *C01B 3/32* (2013.01); *C01B 3/36* (2013.01); *C10J 2300/093* (2013.01); *C10J 2300/0983* (2013.01)

(58) Field of Classification Search
CPC ............ C10J 3/725; C01B 3/32; C01B 3/36
USPC ........................................................ 423/650
See application file for complete search history.

(56) References Cited

U.S. PATENT DOCUMENTS

| | | | | |
|---|---|---|---|---|
| 2004/0211295 | A1* | 10/2004 | Kikuchi | C21B 13/0006 75/484 |
| 2006/0053791 | A1* | 3/2006 | Prentice, III | F23G 5/006 60/645 |
| 2013/0125462 | A1* | 5/2013 | Greiner | F23C 10/005 48/61 |

OTHER PUBLICATIONS

Coker et al. "Ferrite-YSZ composites for solar thermochemical production of synthetic fuels: in operando characterization of CO2 reduction." J. Mater. Chem., 2011, 21, 10767-10776.*

* cited by examiner

*Primary Examiner* — Paul A Wartalowicz
(74) *Attorney, Agent, or Firm* — Daniel J. Jenkins

(57) ABSTRACT

The present disclosure is directed to methods using durable functional materials for processes that include an oxidation step. The durable functional materials are redox active oxygen carrier materials that include a zirconia or yttria-stabilized-zirconia (YSZ) matrix containing a redox-active metal ion(s), such as, but not limited to Fe, Mn, Cu, Co and Cr. In an embodiment, these materials are used in chemical looping processes.

11 Claims, No Drawings

METHODS UTILIZING DURABLE FUNCTIONAL MATERIALS FOR CHEMICAL PROCESSES THAT INCLUDE AN OXIDATION STEP

CROSS-REFERENCE TO RELATED APPLICATIONS

This application claims priority to provisional patent application U.S. Ser. No. 62/234,470, entitled "Systems and Methods Utilizing Durable Functional Materials for Chemical Processes that Include an Oxidation Step," by Miller et al., filed Sep. 29, 2015, the disclosure of which is incorporated herein by reference in its entirety.

STATEMENT CONCERNING FEDERALLY-SPONSORED RESEARCH

This invention was developed under Contract DE-AC04-94AL85000 between Sandia Corporation and the United States Department of Energy. The U.S. Government has certain rights in this invention.

FIELD OF THE INVENTION

The present invention is directed towards improved functional materials for chemical conversions of carbon and hydrocarbons that include an oxidation step to produce heat or a chemical product. More specifically, the present invention is directed to Chemical Looping processes using a zirconia or yttria-stabilized-zirconia (YSZ) materials containing reducible metal ions, such as, but not limited to Fe, Mn, Cu, Co and Cr.

BACKGROUND OF THE INVENTION

Chemical Looping Oxidation (CLO) is a group of processes where fuel is oxidized in two steps involving an oxygen carrier, typically a metal oxide, which is recycled within the system. In one step, the fuel is partially or fully oxidized through reaction with the oxide, leaving the oxide in a reduced (oxygen deficient) state. In the second step, the metal oxide is restored to its fully oxidized state by reaction with oxygen from air or another oxygen donor such as steam or carbon dioxide. In the case of Chemical Looping Combustion (CLC), the process releases heat that can be recovered for beneficial use, e.g. power generation. The combined process provides an effective separation of oxygen from air such that the gaseous combustion products are nitrogen-free, providing benefits such as facilitating the recovery of carbon dioxide for sequestration or beneficial use. The metal oxides currently in use tend to degrade over time, for example through sintering, migration of the active phase, and physical degradation such as breakage and attrition. In the case of chemical looping partial oxidation (CLPO), the conditions are manipulated so that the fuel is only partially oxidized to yield useful products in addition to heat. For example, methane ($CH_4$) may be partially combusted to yield a combination of $H_2$ and CO. In this case, the oxide facilitates the process and leads to nitrogen-free products without the need for an air separation step. In the cases of chemical looping reforming (CLR) and chemical looping dry reforming (CLDR), the reoxidation of the oxide is accomplished with either steam or $CO_2$ and yields the chemical products $H_2$ and CO, respectively, typically in addition to some combustion products. Heat must added, or excess fuel is combusted to run the process autothermally, in these cases.

A number of different metal oxides have been used for chemical looping processes. However improved materials, particularly in the areas of durability (attrition and sinter resistance, agglomeration resistance) and stability (consistent reaction rates and reaction extents) over thousands of cycles, are still sought.

SUMMARY OF THE INVENTION

According to the present disclosure, processes are disclosed that utilize durable functional materials for processes that include an oxidation step.

The present disclosure is directed to chemical looping processes that use zirconia or yttria-stabilized-zirconia (YSZ) materials containing reducible transition metal (TM) ions, such as, but not limited to Fe, Mn, Cu, Co and Cr, to chemically convert carbon and/or hydrocarbons to heat and/or a chemical product through an oxidation process. The chemical looping process may be, but is not limited to an air separation process, where oxygen is separated from a fluid stream including oxygen, a chemical looping combustion (CLC) process, wherein a carbon and/or hydrocarbon is converted to heat and/or a chemical product, a chemical looping partial oxidation (CLPO) process, wherein a carbon or hydrocarbon is converted partially or in full to partially oxidized products, e.g. CO and $H_2$, a chemical looping reforming (CLR) process, wherein a carbon or hydrocarbon and steam are converted to partial oxidation and combustion products, e.g. CO, $H_2$, $CO_2$, and $H_2O$, and a chemical looping dry reforming (CLDR) process, wherein a carbon or hydrocarbon and $CO_2$ are converted to partial oxidation and combustion products, e.g. CO, $H_2$, $CO_2$, and $H_2O$.

In these processes, the reducible metals are dispersed largely or wholly within the zirconia matrix at an atomic scale. The metal ions provide the reduction/oxidation capacity in a stable form, while the zirconia phases provide a matrix for effective and rapid oxygen ion transport into and out of the bulk so that the material may be utilized in the form of physically dense and hard attrition-resistant particles. In these materials, the zirconia (and/or YSZ) phases are not a support in the traditional catalyst sense, i.e., a high surface area inert carrier or scaffold containing an active phase, but rather an active integral participant in the chemistry. In these zirconia-based materials, the reducible metals are dispersed largely or wholly within the zirconia matrix at an atomic scale. These metal ions provide the reduction/oxidation capacity. Because the metal ions are effectively dissolved in the zirconia phase, they are less prone to migration, agglomeration, and deactivation. The zirconia phases provide a matrix for effective and rapid oxygen ion transport into and out of the bulk of the zirconia matrix so that the material may be utilized in the form of hard and dense particles or other geometries.

One of the important factors in CL processes is the maximum oxygen capacity of the material. In the disclosed processes, this is largely determined by the solubility of the reducible metal ion in the zirconia matrix. The solubility can be manipulated through mechanisms such as co-substitution. For example, materials including Fe are responsive to the amount of Y present in the system. Therefore, the material hybrid materials disclosed may include multiple metal ions (2 or more) added to the zirconia matrix to optimize the capacity.

In an embodiment, the disclosure is directed to a method that includes contacting a redox active oxygen carrier material with a fluid stream to reduce a redox active metal oxide in the redox active oxygen carrier material and oxidize a component in the fluid stream; and contacting the redox active oxygen carrier material with a second fluid stream to oxidize the reduced redox active metal; wherein redox active oxygen carrier material comprises the redox active metal atomically dispersed in a zirconia or yttria-stabilized zirconia matrix An advantage of this disclosure is that chemical looping processes are disclosed that utilize materials having improved durability and lifetime. The degradation over time of materials currently being used is a major hindrance to commercialization.

DETAILED DESCRIPTION OF THE INVENTION

The present disclosure is directed to chemical looping oxidation processes that use a composite or hybrid material composed of redox active metal oxide or oxides and a thermally stable oxygen-ion-conducting matrix. These materials may be referred to as redox active oxygen carrier materials. The redox active metal oxide is selected from a group including Fe, Mn, Cu, Co, Cr, and other transition metals and mixtures thereof. The redox active metal oxide is incorporated into crystalline zirconia or yttria-stabilized zirconia (YSZ) at the atomic scale; for example, the transition metal cation can substitute for Zr or occupy a vacant site in the crystal lattice. In this disclosure, this material may be referred to as the metal oxide/matrix material. In this material, the oxygen capacity is provided by the multiple redox states available to the redox metal. The zirconia or YSZ matrix provides a robust and thermally-stable structural foundation and accommodates the metal ion reduction by the formation of lattice oxygen vacancies; high oxygen conductivity facilitates oxygen mobility in and out of the matrix and ensures that the redox capacity can be fully realized. Additional additives may be used to manipulate metal solubility and other properties such as oxygen transport. For example, an additional solubility may be introduced by doping the metal oxide/matrix material with multiple reducible cations.

The metal oxide/matrix materials form a single, active phase composite, in contrast to the prior art materials that consist of an active oxide supported on an inert carrier matrix. The material can be expected to have many of the favorable physical attributes of zirconia or YSZ. The transport properties of the YSZ or zirconia will minimize or eliminate the need for high surface area, e.g. porosity. There is no second active phase to migrate, infiltrate, volatilize, change in volume or experience other significant changes that may to degrade the performance, chemical or physical, over time. These issues are all bypassed by beginning with a material in a thermodynamically stable (or near-stable) condition.

Using Fe as an example, the redox or oxygen storage capacity is largely limited by the amount of Fe that can be solubilized in the carrier matrix. Fe in excess of this concentration is less stable, and the mobility of the Fe cation could contribute over the long term to physical degradation. The approach to increase the oxygen capacity is to increase the amount of soluble redox capable metals via simple substitution and co-doping, for example with Mn and similar cations. The solubility of Mn in YSZ has reported to be 15 mol % in 8-YSZ (Mn/(Mn+Zr+Y)) and as high 32 mol % (Mn/(Mn+Zr)) in $ZrO_2$ at elevated temperatures. Other reports suggest that single phase (by powder X-ray diffraction) Mn-, Co-, Cr-, Fe-, and Ni-doped cubic zirconia can all be prepared at 20 mol % transition metal (TM) concentration (TM/(TM+Zr)). In the case of Mn, one may expect the oxygen capacity to be increased relative to Fe not only by improved solubility, but also by the fact that the Mn could conceivably cycle between the +4 and +2 oxidation states (as opposed to +3 and +2 for Fe).

In the Fe/zirconia and Fe/YSZ oxygen carrier systems described herein, the zirconia or yttria-stabilized zirconia can be doped with iron up to the solubility limit (about 10 mol % Fe depending on the temperature and redox state of the Fe). In these materials, the Fe is homogeneously dispersed throughout the zirconia or YSZ at the atomic scale. The redox active oxygen carrier maintains important properties of both parents; the dissolved Fe is redox active while the zirconia or YSZ provides transport of oxygen into and out of the bulk solid making the Fe highly accessible for reaction. This form of the material is highly stable and to the best of our knowledge can be chemically or thermally reduced and reoxidized indefinitely; there is no separate iron oxide phase to mobilize or agglomerate, and the reaction is not surface limited.

The processes described herein provides benefit over conventional approaches to these materials wherein the Fe would be supported on the surface of a high surface area carrier, e.g alumina. As these materials are cycled and age, iron migrates and agglomerates (precipitates) to form ever larger particles. As the particles grow, the portion of the Fe that can be effectively utilized for reaction decreases, since the reaction becomes surface-limited. Though both systems contain Fe, the Fe in the conventional system remains largely as a phase that is distinct from the support at the temperatures of relevance to chemical looping.

The disclosed chemical looping processes include two steps. In the first step, the solid redox-active oxygen carrier is exposed to a stream containing chemically reducing species such as carbons and hydrocarbons. A chemical reaction between the redox active materials and the reducing species occurs in which oxygen is transferred from the redox-active oxygen carrier to the reducing species. That is, the oxygen carrier is reduced, while the carbon/hydrocarbon is oxidized. An example is shown in equation 1 wherein methane reacts with a metal oxide.

$$4/\delta MO_x + CH_4 \rightarrow 4/\delta MO_{(x-\delta)} + CO_2 + 2H_2O \qquad (1)$$

In the above and following reactions, δ represents an oxygen nonstoichiometry.

In the second step, the redox-active oxygen carrier is oxidized via exposure to and reaction with oxygen (equation 2). In an embodiment, the oxygen may be in an air stream (equation 2). This reaction regenerates the material so that it may once again be employed to accomplish reaction 1. The two reactions of the looping process, 1 and 2, sum to achieve a desired reaction (equation 3), in this example, the combustion of methane.

$$4/\delta MO_{(x-\delta)} + 2O_2 \rightarrow 4/\delta MO_x \qquad (2)$$

$$CH_4 + 2O_2 \rightarrow CO_2 + 2H_2O \qquad (3)$$

Depending on the identity of the hydrocarbons and metal species in question, heat is generated in one or both steps of the reaction. This heat generated in reaction 2 can be used, for example, but not limited to process heat or removed to drive a power production cycle, or recycled to enhance system efficiency, or recycled to provide energy to the endothermic first step for example.

Oxygen Separation

The invention is further directed to an air separation process that uses the disclosed chemical looping process to accomplish an oxygen separation from air. As described above in equation 2, the reduced material reacts selectively with oxygen from air. By removing the solid from the air environment, and subsequently introducing it to a reducing environment as depicted in equation 1, oxygen is in effect provided for reaction free of the other components of air. The advantages of accomplishing this separation are well known. For example, air contains 79% nitrogen, and therefore the products from conventional hydrocarbon/air combustion ($CO_2$ and $H_2O$) are diluted in a large excess of nitrogen. Separating the $CO_2$ from the nitrogen for subsequent use or sequestration requires significant investment and energy. If the combustion is accomplished via a chemical looping process instead, i.e. CLC, this separation is avoided.

Chemical Looping Combustion (CLC)

CLC, by oxidation of the fuel stream, produces heat and oxidation products. An example is provided above for methane in equations 1, 2, and 3. The reaction can be carried out with any combustible hydrocarbon or mixture of hydrocarbons, including gasses, liquids, and solids. For example, natural gas, diesel or kerosene fuels, biomass solids, or coke can be processed in such a way to provide useful heat with a nitrogen-free effluent stream. Further for example, CLC process may be used with methane, propane, ethanol, un-refined or partially refined petroleum products (liquid or gas), or coal, to produce predominantly $CO_2$ and $H_2O$, as well as heat, upon oxidation.

Chemical Looping Partial Oxidation (CLPO)

CLPO is an alternative to CLC that capitalizes on the fact that through manipulating the relative flow rates of air, hydrocarbon and oxide, the system can be made more or less oxidizing or reducing such that a carbon or hydrocarbon is converted partially or in full to partially oxidized products, e.g. CO and $H_2$. Through these manipulations, coupled with proper materials composition selection, partial oxidations can be achieved. For example, methane can be partially oxidized to synthesis gas (complete combustion and other products may also be produced, i.e. the reaction may not be 100% selective) as shown in equation 4 and 5 (overall reaction is equation 6).

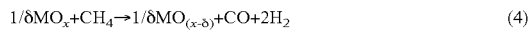  (4)

  (5)

  (6)

Examples of CLPO, are, but are not limited to natural gas and other light hydrocarbons to synthesis gas (mixtures including CO and $H_2$), and coke and coal to synthesis gas, and other reactions such as, but not limited to forming ethane into ethylene. Further examples of CLPO include, but are not limited to partial oxidation of methane, propane, ethanol, un-refined or partially refined petroleum products (liquid or gas), or coal, which produce predominantly CO and $H_2$ as well as heat upon partial oxidation.

Chemical Looping Reforming (CLR) and Dry Reforming (CLDR)

CLR and CLDR processes are analogous to CLC and CLPO except that $H_2O$ and $CO_2$, respectively, are included in the reactants fed to the system. These processes can take two forms. In the first, steam (CLR) or $CO_2$ (CLDR) are co-fed with a hydrocarbon. Equations 7-9 depict CLR for a generic hydrocarbon reacting with steam and an oxygen carrier to produce a mixture of product gasses.

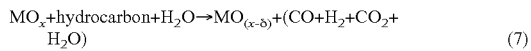  (7)

  (8)

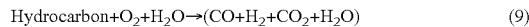  (9)

The second form of CLR and CLDR replaces the air with either steam or $CO_2$ to produce relatively pure streams of $H_2$ or CO. This process depicted with steam in equations 10, 11, and 12.

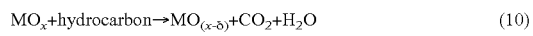  (10)

  (11)

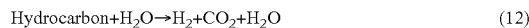  (12)

This alternate case not only shifts the products from the reoxidation side of the system but also alters the energy balance. For these cases, the overall reactions are endothermic and therefore provisions must be made to add heat to the system whereas it is extracted in the combustion processes. A benefit of these alternate CLR and CLDR approaches is the production of high purity $H_2$ (carbon free, reaction 11) and CO (hydrogen free, reaction 11 substituting $CO_2$ and CO for $H_2O$ and $H_2$) streams, respectively.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method, comprising
   contacting a redox active oxygen carrier material with a fluid stream to reduce a redox active metal oxide in the redox active oxygen carrier material and oxidize a component in the fluid stream; and
   contacting the redox active oxygen carrier material with a second fluid stream to oxidize the reduced redox active metal;
   wherein redox active oxygen carrier material comprises a redox active metal ion atomically dispersed in a zirconia or yttria-stabilized zirconia matrix.

2. The method of claim 1,
   wherein the fluid stream comprises a carbon or hydrocarbon.

3. The method of claim 2, wherein the hydrocarbon is selected from a group consisting of methane, ethane, propane, butane, kerosene, diesel fuel, coke, biomass and coal.

4. The method of claim 1, further comprising:
   contacting the redox active oxygen carrier material with a second fluid stream to oxidize the reduced redox active metal oxide and form partially reduced products.

5. The method of claim 4, wherein the partially oxidized products are selected from a group consisting of hydrogen and carbon monoxide.

6. The method of claim 1, wherein the redox active metal ion is selected from a group consisting of ions of Fe, Mn, Cu, Co and Cr.

7. The method of claim 1, further comprising:
   wherein the second fluid stream comprises air; and
   reducing the redox active oxygen carrier material with a hydrocarbon or via thermal means, and reducing the redox oxygen carrier material to produce oxygen.

8. The method of claim 1,
wherein the fluid stream comprises steam and a hydrocarbon.

9. The method of claim 1,
wherein the fluid stream comprises carbon dioxide and a hydrocarbon.

10. The method of claim 1, wherein the fluid stream comprises steam and a hydrocarbon.

11. The method of claim 1, wherein the fluid stream comprises water and a hydrocarbon.

* * * * *